(12) United States Patent
Mustonen et al.

(10) Patent No.: US 8,712,219 B2
(45) Date of Patent: Apr. 29, 2014

(54) METHOD FOR EDITING A MEDIA CLIP IN A MOBILE TERMINAL DEVICE, A TERMINAL DEVICE UTILIZING THE METHOD AND PROGRAM MEANS FOR IMPLEMENTING THE METHOD

(75) Inventors: Mika P. Mustonen, Ii (FI); Markku Rytivaara, Oulu (FI); Minna Karukka, Oulu (FI)

(73) Assignee: Core Wireless Licensing S.a.r.l., Luxembourg (LU)

(*) Notice: Subject to any disclaimer, the term of this patent is extended or adjusted under 35 U.S.C. 154(b) by 1524 days.

(21) Appl. No.: 11/025,803

(22) Filed: Dec. 28, 2004

(65) Prior Publication Data

US 2005/0152668 A1 Jul. 14, 2005

(30) Foreign Application Priority Data

Dec. 29, 2003 (FI) ...................................... 20031908

(51) Int. Cl.
*H04N 5/93* (2006.01)
(52) U.S. Cl.
USPC .......................................... 386/278; 386/282
(58) Field of Classification Search
USPC ............. 455/556.1, 556.2; 348/211.2; 386/46
See application file for complete search history.

(56) References Cited

U.S. PATENT DOCUMENTS

| 5,708,698 | A | 1/1998 | Akahane | 379/89 |
|---|---|---|---|---|
| 6,400,378 | B1* | 6/2002 | Snook | 715/716 |
| 6,483,913 | B1 | 11/2002 | Smith | 379/368 |
| 7,834,916 | B2* | 11/2010 | Shibata et al. | 348/231.6 |
| 2002/0012523 | A1* | 1/2002 | Nakatani | 386/52 |
| 2002/0028060 | A1* | 3/2002 | Murata et al. | 386/52 |
| 2002/0031262 | A1* | 3/2002 | Imagawa et al. | 382/190 |
| 2002/0181671 | A1 | 12/2002 | Logan | 379/88.13 |
| 2003/0016254 | A1* | 1/2003 | Abe | 345/864 |
| 2003/0027604 | A1* | 2/2003 | Hayashi | 455/567 |
| 2004/0042764 | A1* | 3/2004 | Takinami et al. | 386/52 |
| 2004/0072589 | A1* | 4/2004 | Hamamura et al. | 455/550.1 |
| 2004/0240845 | A1 | 12/2004 | Hayashi | 386/52 |
| 2005/0041953 | A1* | 2/2005 | Lo | 386/52 |

FOREIGN PATENT DOCUMENTS

| EP | 1 111 883 A2 | 6/2001 |
|---|---|---|
| EP | 1 111 883 A3 | 11/2003 |
| EP | 1 429 291 A1 | 6/2004 |
| WO | WO/03085970 | * 10/2003 |
| WO | WO-2005/009044 A1 | 1/2005 |

* cited by examiner

Primary Examiner — William C Vaughn, Jr.
Assistant Examiner — Asher Khan

(57) ABSTRACT

An aspect of the invention relates to a method for editing a media record in a terminal device of a cellular network, by removing at least one portion of the original contents of the media record. The state of editing is shown on the display of the terminal device with a pointer arrangement. An aspect of the invention also relates to a cellular network terminal device in which the method is utilized. In the terminal device the media record editing is controlled with a program application.

24 Claims, 4 Drawing Sheets

METHOD FOR EDITING A MEDIA CLIP IN A MOBILE TERMINAL DEVICE, A TERMINAL DEVICE UTILIZING THE METHOD AND PROGRAM MEANS FOR IMPLEMENTING THE METHOD

FIELD OF THE INVENTION

The invention relates to a method for editing a media record in a terminal device of a cellular network, in which method editing means removing at least one portion of the original length of the media record. The invention also relates to a terminal device of a cellular network, in which terminal device said method is utilized, and program means that implement the method in the terminal device.

BACKGROUND OF THE INVENTION

The size of various data processing devices has decreased, and often the devices have also become mobile. One example of such devices is the telephone. Telephones of a fixed network are becoming replaced by various terminal devices used in a cellular network. These terminal devices can process information in a very versatile manner. They are no more merely devices by which two or more persons can converse with each other in real time. These devices can be used to transmit speech, data, written messages, images, videos and combinations of all those listed.

One of the newest ways of using these terminal devices is the possibility to save and transmit various media records, such as image, sound and videos. The terminal devices already have means for taking, saving and transmitting video image. However, transmitting a long video sample, for example, requires plenty of transmission capacity of the data transfer network. In addition, the memory capacity of a terminal device is still limited, and so it is desirable that only such video samples are saved in the terminal device that provide some useful purpose or pleasure for the user of the terminal device. On the other hand, the video sample to be saved or transmitted can also contain portions that have little informative value. It is also possible that the sender does not want to send all the video image saved by him/her to a certain receiver for some reason. For the above mentioned reasons, the user needs to modify the video sample in the terminal device by which it was originally taken before it is finally saved or transmitted to another terminal device.

It is known from EP 1 111 883 how pictures can be added to a SMS message. From U.S. Pat. No. 6,483,913 it is known how to add text to a picture in a mobile phone.

From US 2002/0181671 it is known how audio signal can be saved in a mobile terminal and transmitted further. However the audio signal is saved as such without any edition. So for the present there have not been disclosed an easy-to-use video sample processing means available for terminal device users.

SUMMARY OF THE INVENTION

The purpose of the present invention is to provide a new method and arrangement to be utilized in a terminal device of a cellular network, by means of which the terminal device users can edit the media records in their terminal devices in the desired manner before the media records are finally saved or transmitted. The media record can comprise audio, video or animation records.

The objectives of the invention are achieved with a method and arrangement by which the terminal device users can run a media record in their terminal devices in a distinct edit mode. Then the users can set start and end marks for the cutting at desired points during the media presentation. The set start and end marks with their locations are visible to the user all the time during editing. When the editing is complete, only the media record between the start and end marks, which has been processed by the user, is saved in the memory of the terminal device.

The invention has the advantage that the terminal device user can process and edit the media record saved by him/her with the same terminal device by which it was recorded.

In addition, the invention has the advantage that the places of the edit marks made are visible to the user of the terminal device during the whole editing process.

In addition, the invention has the advantage that the parts of the media record that remained outside the edited version can be saved as a separate entity when required.

In addition, the invention has the advantage that when only the cut and shortened media record is finally saved, its memory requirement is reduced.

A further advantage of the invention is that the processed media record needs less data transfer capacity when it is transferred from one terminal device to another via a data transfer network.

The method according to the invention for editing a media record is characterized in that it comprises
- a step for switching to the editing of the media record
- a step for starting the editing, which editing comprises the first, second and third presentation modes
- a step at which the terminal device functions in the first or second presentation mode, during which at least one edit start mark can be set in the media record with the first program key of the terminal device, and the start mark is presented with a pointer arrangement on the display of the terminal device
- a step for stopping the editing, and
- a step for producing an edit report on the display of the terminal device.

The terminal device according to the invention is characterized in that it comprises
- means for switching to the media record edit mode
- means for starting the editing, which editing comprises the first, second and third presentation modes
- means for setting at least one start mark in the media record in the first or second presentation mode, which start mark is arranged to be presented with a pointer arrangement on the display of the terminal device
- means for pausing the editing temporarily
- means for stopping the editing, and
- means for producing an edit report on the display of the terminal device.

The program means according to the invention that are saved in the terminal device of the cellular network are characterized in that they comprise
- means for switching the terminal device to the media record edit mode
- means for starting the media record editing in the first, second or third presentation mode
- means for setting at least one edit start mark in the media record being processed in the first or second presentation mode, which start mark can be presented with a pointer arrangement on the display of the terminal device
- means for pausing the editing temporarily
- means for stopping the editing, and
- means for producing a report of the end result of the editing on the display of the terminal.

Some preferred embodiments of the invention are presented in the dependent claims.

The basic idea of the invention is the following: There are program means saved in the terminal device, by which program means the media record saved in the terminal device can be run in the edit/cut mode according to the invention. The media record preferably comprises audio, video or animation portions. In the edit mode according to the invention the terminal device user can mark one or more media clip start and/or end points at the desired points by using the press keys of the terminal device. The cut start and end points are advantageously marked with two separate keys of the terminal device, which have been defined to function as such cutting means in the cutting mode according to the invention. In the edit mode, the marked cutting points are continuously visible on a pointer representing the original length of the media record on the display of the terminal device. In the edit mode according to the invention the terminal device users can change, add or remove the cut start and end marks they have made before finally saving the media record in the memory of the terminal device. In addition, during the editing it is possible with a separate selection key to open pop-up menus that support the cutting operation, in order to make the media record editing easier and more versatile by means of these pop-up menus. Similarly, by using a four-way key, for example, it is possible to move quickly within the media record from one place to another.

BRIEF DESCRIPTION OF THE DRAWINGS

In the following, the invention will be described in more detail. Reference will be made to the accompanying figures, in which FIG. 3b shows the display of the terminal device in the first presentation mode PLAYING I of the state diagram of FIG. 3a.

FIG. 3c shows the display of a terminal device in the second presentation mode PLAYING II of the state diagram of FIG. 3a.

DETAILED DESCRIPTION

Figure 1:
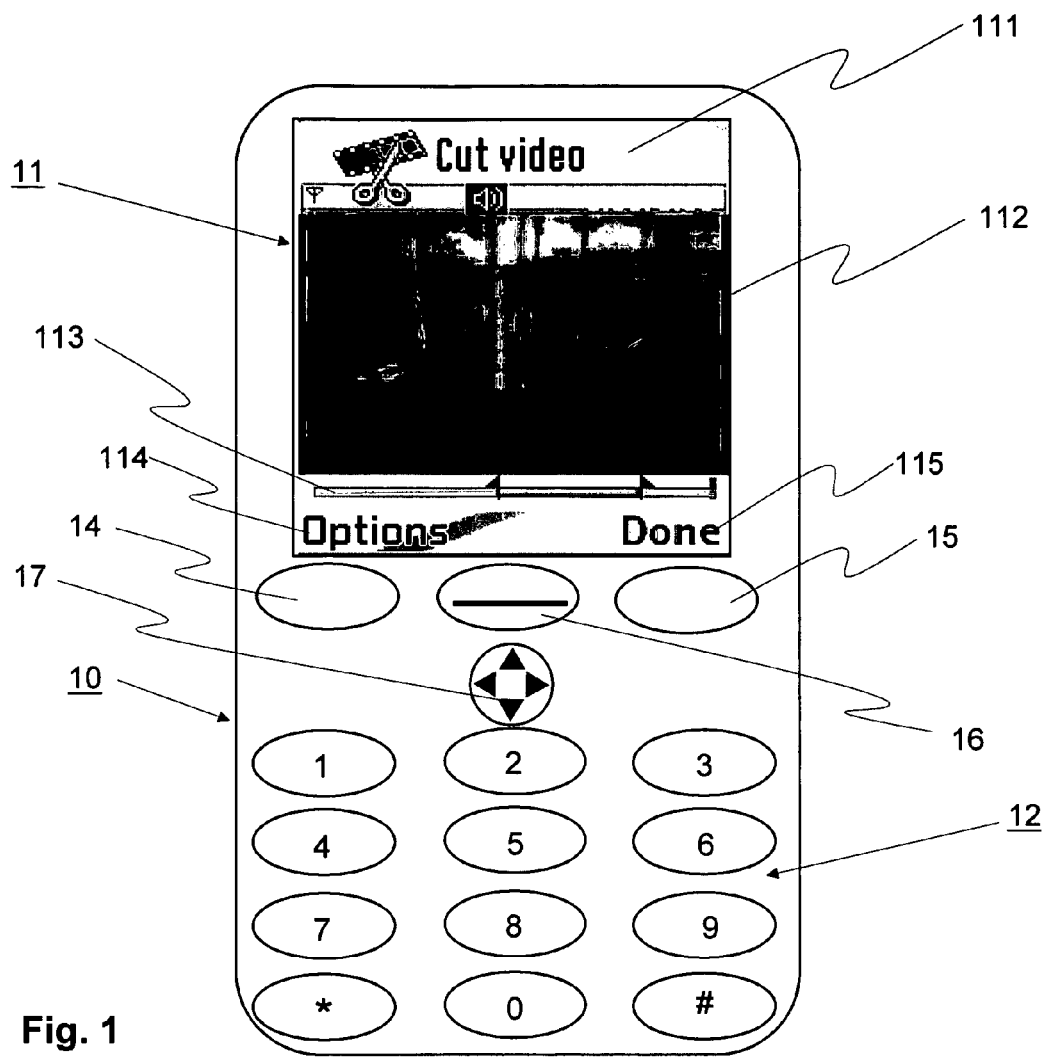
FIG. 1 shows an example of a terminal device according to the invention with its functional parts in the edit mode according to the invention.

FIG. 1 shows one exemplary terminal device 10, in which the invention can be applied. The terminal device 10 comprises a display unit 11, a numerical/alphabetical keyboard 12, a four-way key 17 and at least one programmable key 14-16. The programmable keys 14-16 have been arranged to perform an operation, which is shown on the display 11 of the terminal device 10. In the example of the figure, the keys 12, 17 and 14-16 have been implemented as separate physical keys by way of example. It is obvious to a person skilled in the art that they can also be implemented with the principle of a touch-screen display, in which case the limit between the actual display part 11 and the part that contains keys 12, 17 and 14-16 is a question of definition.

In view of utilizing the invention, the essential and most visible parts of the exemplary terminal device shown in FIG. 1 are the display 11, keys 14 and 16 and the menu key 16. In addition, the four-way key 17 can be used for moving quickly from one place to another within the media record in the edit mode according to the invention as well.

In the example of the figure, the display 11 comprises visible blocks that are distinguishable from each other. Block 111 that is uppermost on the display 11 advantageously includes a symbol representing the cutting mode of the media record, and text. The media record to be cut, such as a video, is presented in block 112 of the display 11.

In the example of FIG. 1, there is a third block below block 112, which advantageously comprises a pointer arrangement 113, by means of which it is indicated which portion of the original length of the media record being presented is shown at the moment and where the start or end marks have been placed. In addition, the operations 114 and 115 possibly associated with the programmable keys 14 and 15 are shown in this block. It is obvious to a person skilled in the art that the pointer arrangement 113 according to the invention shown in the example of FIG. 1 can be located anywhere on the display 11. Similarly, the operations associated with the keys 114 and 115 can naturally be other than the examples shown in FIG. 1.

The media record cutting mode according to the invention is advantageously controlled with three keys. Key 14 or 15 carries out the operation which is shown on the display 11 closest to the key. In the example of FIG. 1 the first operation 114, Options, has been associated with the first programmable key 14, and the operation 115, Done, with another programmable key 15. In the invention it is also possible to utilize a third programmable key 16, which is advantageously a menu key. With it a pop-up menu can be opened on the display 11, from which pop-up menu some additional facilities used for performing the editing can be selected. The contents of the pop-up menu depend on the stage of editing at which the menu key 16 has been pressed.

Figure 2:
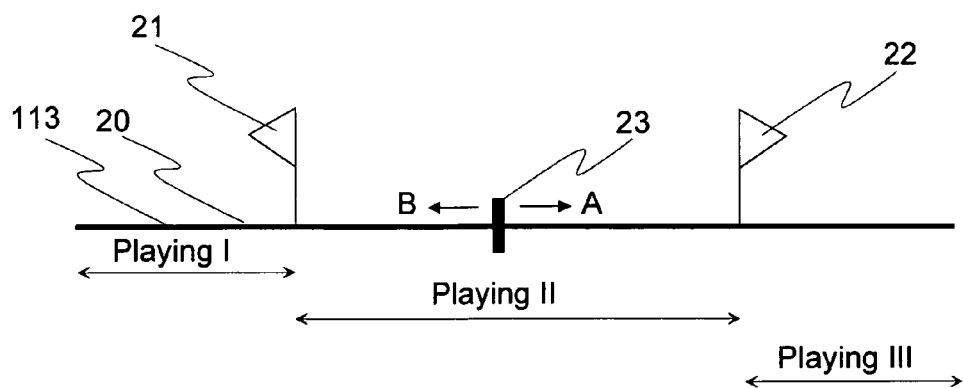
FIG. 2 shows an example of a pointer arrangement in the cut mode according to the invention on the display of the terminal device with the exemplary cut marks of the pointer arrangement, and three different possible edit modes.

FIG. 2 shows by way of example what the pointer arrangement 113 used to aid the cutting advantageously comprises. The pointer line 20 shows the whole uncut length of the media record to be cut. Mark 21 shows an exemplary start mark from which the media clip to be saved starts. Mark 22 shows an exemplary ending mark to which the media clip to be saved ends. Any desired number of start marks 21 and end marks 22 can be set on the whole length of the uncut media record. However, the ending mark 22 must be preceded by at least one start mark 21. If the user does not set any ending marks 22, one will be generated when the media record has been completely presented in the edit mode according to the invention. The exemplary location pointer 23 shown in FIG. 2 moves along the pointer line 20 in the direction of arrow A, when the media record to be cut is shown. The pointer arrangement 113 according to the invention facilitates the terminal device user's editing operation, because all the set beginning and ending marks are visible to the terminal device user all the time.

In the edit mode according to the invention the location pointer 23 can be moved with a prior art four-way key 17 in two directions A or B. This enables searching for the correct cutting point either from the right or left with a four-way key 17. The searching can be carried out either image by image or by fast winding. Which of these operations is in use, depends on how long the four-way key 17 is pressed.

In addition, three different cutting and presentation modes are shown in FIG. 2. In each of these three modes the operations that are associated with the programmable keys 14 and 15 and the menu key 16 have been defined separately. The operation of these modes and the functions associated with the keys are described in more detail in connection with FIG. 3. Before the first set start mark for cutting 21, the operation is in the first presentation mode PLAYING I. The location pointer 23 then moves in the area of the media record pointer line 20, which is before the first start mark 21.

When the location pointer 23 has passed the first start mark 21 set in the media record, the operation moves to another presentation mode PLAYING II. As a result of this, the functions of the press buttons 14-16 change.

When the last ending mark 22 set in the media record earlier by the user has been passed, the operation is in the third presentation mode PLAYING III. In this presentation mode the press buttons 14 to 16 also have defined functions, which differ from the preceding presentation modes.

FIG. 3 shows an exemplary state/transfer diagram about the kind of operational modes there are in the method according to the invention, what kinds of transfer are possible between them and by which measures the transfers can be carried out. In connection with the description in FIG. 3, the markings shown and explained in FIGS. 1 and 2 are also utilized.

The initial situation is described by reference 300. In that situation there are two functions, View and Edit, selectable on the display 11 of the terminal device 10. In this situation there is a menu on the display of the terminal device, and by selecting the alternative "Cut" from the menu, switching to the starting mode 310 of Edit/Cut takes place according to the invention. However, the playing of the media record has not been started yet. When required, it is possible to use the four-way key 17 of the terminal device 10 for moving to the desired starting point within the media record before starting the editing.

In the entering mode 310, key 14 is associated with the command "Play" on the display and key 15 with the command "Back". Thus the pressing 314 of the first programmable key 14 starts the media clip cutting process. As a result of this, the process moves to the first presentation mode 320, which is called PLAYING I. On the other hand, pressing 315 the second programmable key 15 returns the terminal device back to the initial mode 300.

If the menu key 16 is pressed in the entering mode 310, a pop-up menu 1 opens to the display 11 of the terminal device 10, from which menu the alternatives "Play" or "Play marked" can be selected. The first alternative starts the playing of the media record from its beginning. The latter alternative starts the presentation of the edited media clip from the first start mark 21 and ends it to the next end mark 22. If there are several start and end marks, all the clips made are presented in succession up to the last end mark.

From the entering mode 310 the operation is switched to the first presentation mode 320 by pressing the button 314 "Play". In the first presentation mode 320, PLAYING I, the operation is in such an area of the media record in which no set start mark 21 has yet been passed. Therefore only the operation 324, Mark in, associated with the first programmable key 14, is available. With this operation, pressing 324 the key 14, the first start mark 21 for the cutting can be set. Setting the start mark 21 advantageously also gives the terminal device user the first acoustic signal in connection with the setting. The sound can be one beep, for example. No operation has been associated with the other programmable key 15, reference 325.

In addition, in the first presentation mode 320 it is possible to press the menu key 16, whereupon a pop-up menu 2 opens on the display. This pop-up menu 2 comprises the following alternatives: "Continue", "Pause" and "Stop". The first selection alternative would make the presentation continue, but because the playing is already in progress in the first presentation mode 320, it has no effect. The other selection, Pause, takes the presentation to a pause mode 350, PAUSED. In this pause mode 350 the playing of the media record has been temporarily stopped. The third possible choice, Stop, takes the process to a stop mode 360, STOPPED. In this stop mode 360 the playing and editing of the media record has been stopped or it has ended.

When the first media record start mark 21 (Mark in passed) is passed or set, the process moves uninterrupted to the second presentation mode 330, PLAYING II. In the second presentation mode 330 the operation "Mark in" has been associated with the first programmable key 14, and the operation "Mark out" has been associated with the second programmable key 15. In short, the start mark 21 for cutting can be set by selection/key 334, and the end mark 22 for cutting can be set by selection 335. Setting the end mark 22 also advantageously gives the terminal device user an acoustic signal, a second acoustic signal, which can be a double beep, for example. In addition, in the second presentation mode 330 it is also possible to use the menu key 16, whereupon a pop-up menu 2 opens on the display. This pop-up menu comprises the alternatives that were described above: "Continue", "Pause" and "Stop".

When the media record presentation passes the last set end mark 22 (Mark out passed), the process moves to a third presentation mode 340, PLAYING III. In this third presentation mode 340, no function has been associated with the first programmable key 14, reference 344, and the function of the second programmable key 15 is still "Mark out", reference 345. With the selection/key 345 it is thus possible to set a new cutting end mark 22 before the end of the media record.

In addition, in the third presentation mode 340 it is also possible to press the menu key 16, whereupon a pop-up menu 2 opens on the display. This pop-up menu comprises the alternatives that were described above: "Continue", "Pause" and "Stop". In addition, in this third presentation mode it is possible to end up at the end of the media record. This situation automatically generates an end mark 22. After this, the process proceeds to the stop mode 360, STOPPED.

From the presentation and editing modes 320, 330 and 340 described above it is possible to end up in the pause mode 350, PAUSED. In the pause mode 350, the presentation and processing of the media record has been temporarily stopped. In the pause mode 350, the operation "Continue" has been associated with the first programmable key 14, and the operation "Stop" 355 with the second programmable key 15. The selection/key 354 starts the playing of the media record from the point at which it was at the moment the pause was made. The mode from which the processing was paused becomes the playing or processing mode again.

From all the three different presentation and editing modes 320, 330 and 340 and the pause mode 350 it is possible to end up in the stop mode 360, STOPPED. In this stop mode 360 the presentation and editing of the media record has ended or it has been stopped. In the stop mode the operation "Options" 364 has been associated with the first programmable key 14, and the operation "Done" 365 has been associated with the second programmable key 15.

If the operation "Options" is selected, it opens a menu on the display of the terminal device, from which menu the following alternatives are advantageously selectable: "Play marked", i.e. play the cut media record, "Clear marks" i.e. remove the cut marks made, and "Help" i.e. I-want-help-button. From the selection "Options" 364, the terminal device user can also select the possibility to save the parts of the media record that remained outside the edited version.

The four-way key 17 can also be utilized. With the four-way key 17 it is possible to move within the media record away from the stopping point to another point, from which the playing can be started.

If the alternative "Done" 365 is selected, i.e. the other programmable button 15 is pressed, the process moves to an processing mode 370, in which a message appears on the display 11 of the terminal device 10, indicating that the processed media record is being finished for saving. A message like "Processing", for example, can then appear on the display 11. When the saving has been completed, the process returns to the initial mode 300, in which either the viewing or editing of the media clip can be selected.

In the stop mode 360 it is also possible to press the menu key 16, which opens a pop-up menu 1, in which it is possible to play either the whole unclipped media record or just the cut part of the media record.

Figure 3A:
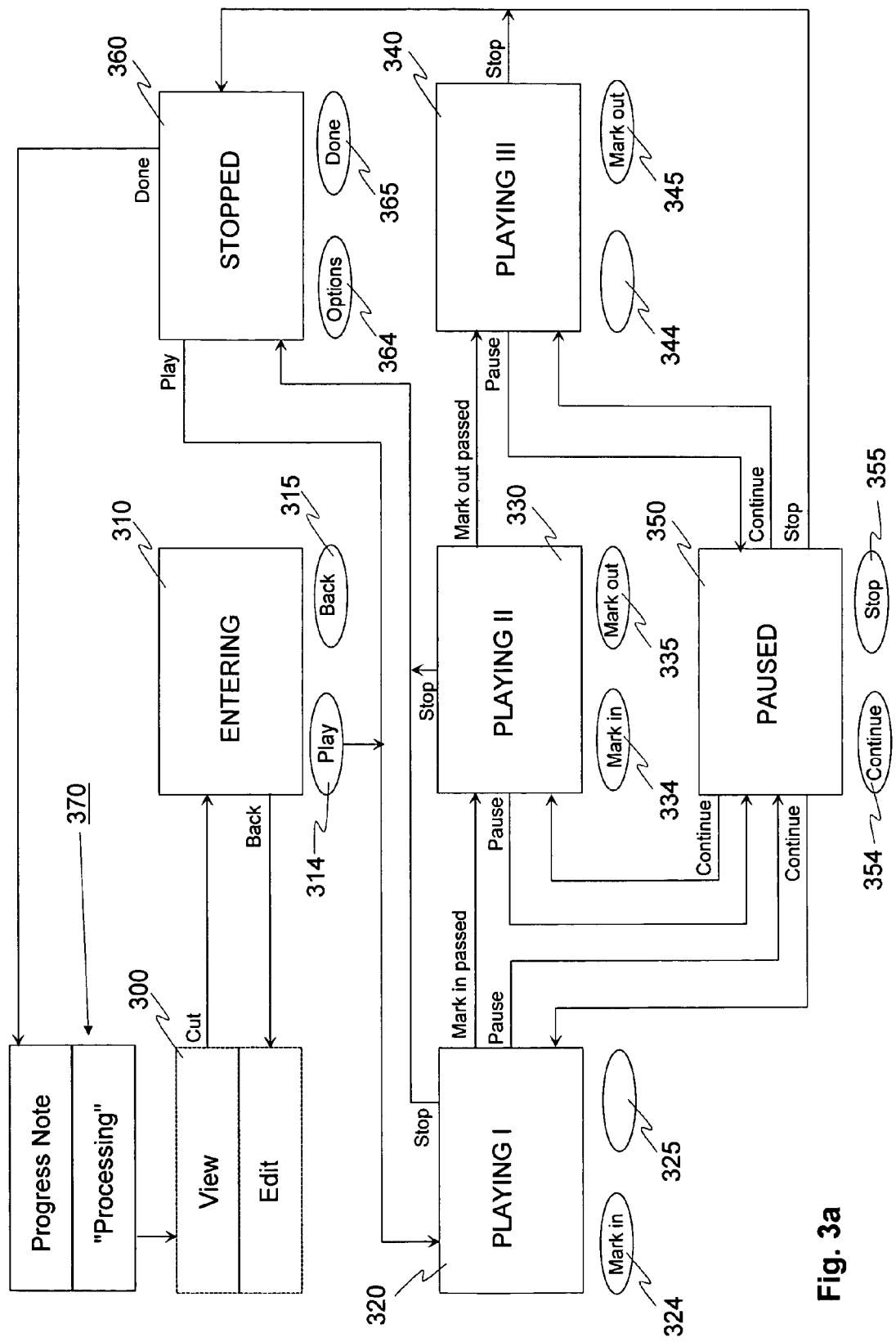
FIG. 3a shows a state diagram of the method according to the invention, illustrating the operation of the editing method according to the invention in a mobile terminal device.
Figure 3B:
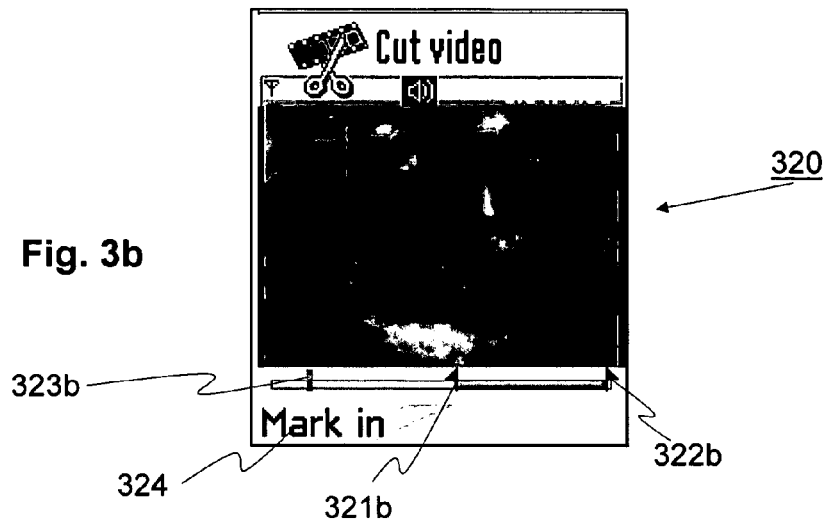

FIG. 3b shows an example of a situation in which the operation is in the first presentation mode PLAYING I, reference 320. The location pointer 323b according to the invention is then on the pointer line before the first start mark 321b set on it. At the end of the pointer line there is an end mark 322b. In the first presentation mode 320 the user can only select setting a new start mark. This can be done by pressing the first programmable key 14 in the terminal device 10, in which case the operation 324, Mark in, is selected.

Figure 3C:
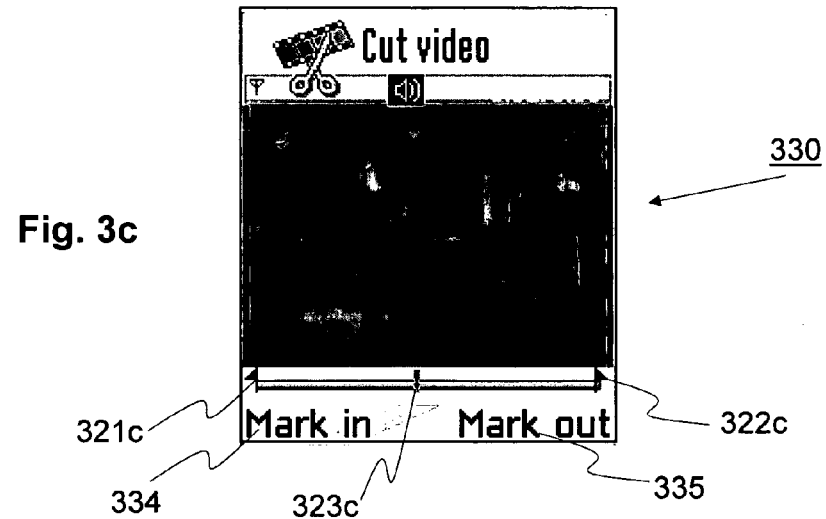

FIG. 3c shows an example of a situation in which the operation is in the second presentation mode PLAYING II, reference 330. The location pointer 323c according to the invention is on the pointer line between the set start mark 321c and end mark 322c. In the second presentation mode 330 the user can select both setting a new start mark and setting a new end mark. A new start mark can be set by pressing the first programmable key 14 in the terminal device 10, in which case the operation 334, Mark in, is selected. A new end mark can be set by pressing the second programmable key 15 in the terminal device 10, in which case the operation 335, Mark in, is selected.

Figure 3D:
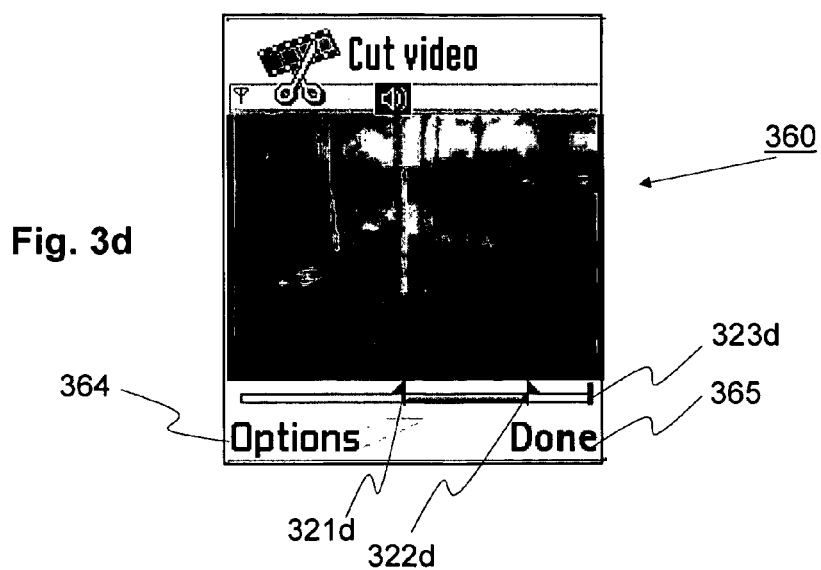
FIG. 3d shows the display of the terminal device in the stopping mode STOPPED of the state diagram of FIG. 3a, and FIG. 4 shows an example of a cellular network terminal device, which is capable of utilizing the method according to the invention.

FIG. 3d shows an example of a situation in which the process is in the stop mode 360 STOPPED. The location pointer 323d according to the invention is then at the end of the pointer line. It has passed all the start marks 321d and end marks 322d on the pointer line. In this stop mode 360 the user can select the following operations. By pressing the first programmable key 14 in the terminal device 10 the selection operation 364, Options, is selected, which opens an additional menu on the display 11 of the terminal device 10. By pressing the second programmable key 15 the saving operation 365, Done, is selected, which starts the saving of the media clip in the memory of the terminal device 10. The four-way key 17 can also be utilized. With the four-way key 17 it is possible to move within the media record away from the stopping point to another point.

The functions shown in FIGS. 3a to 3d are preferably carried out with a software application saved in the terminal device.

Figure 4:
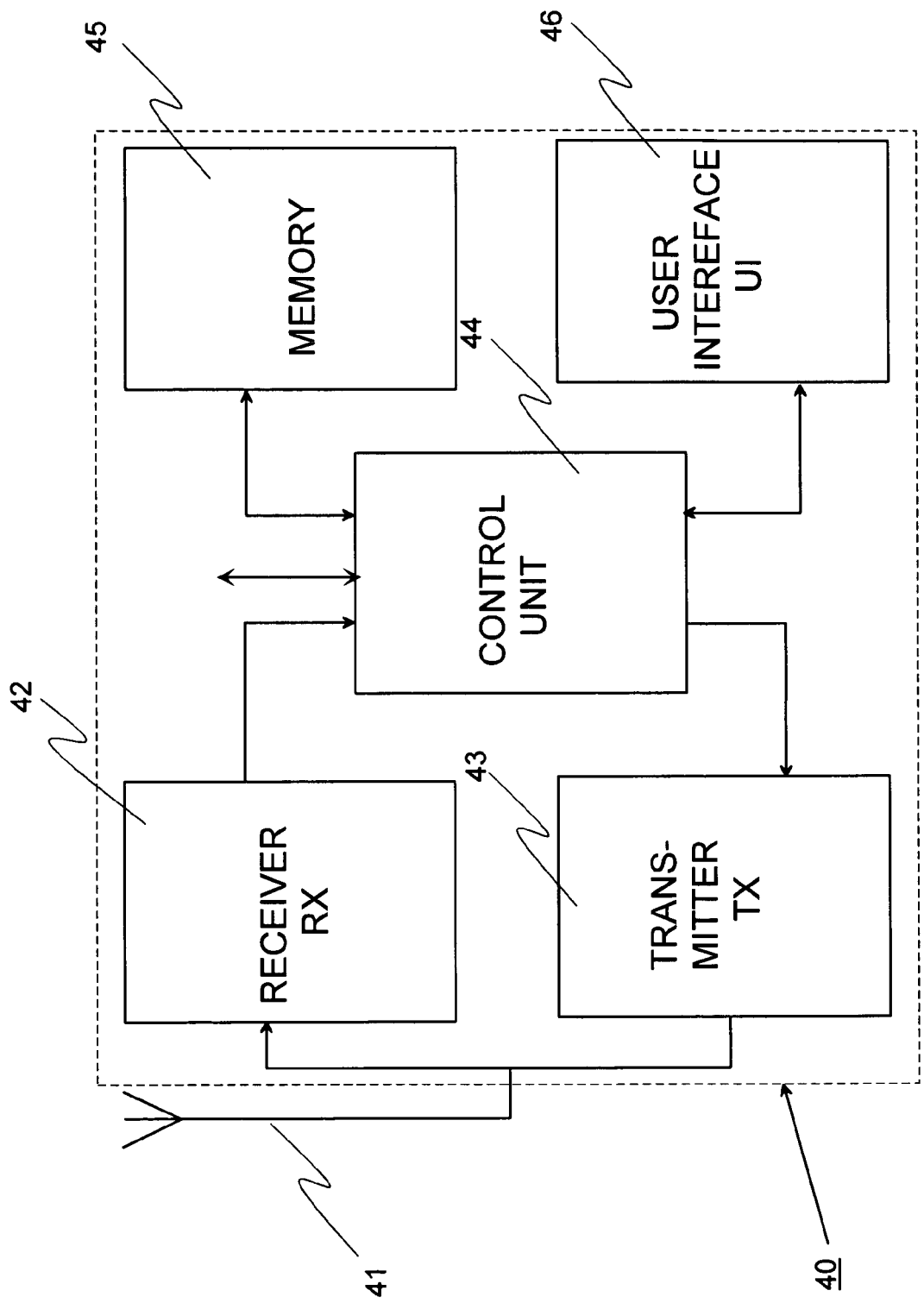

FIG. 4 shows, by way of example, the main parts of the mobile terminal device 40 according to the invention. The terminal device 40 uses an antenna 41 for signal transmission and reception. Reference 42 denotes means of which the terminal device receiver RX consists. The receiver RX comprises prior art means for all messages or signals to be received.

Reference 43 denotes the equipment that constitutes the transmitter TX of the mobile terminal device. The transmitter means 43 perform on the signal to be transmitted all the signal processing measures needed when working with the cellular network.

In the terminal device the parts that are of essential importance with regard to utilizing the invention are the control unit 44 that controls the operation of the terminal device 40 and the user interface 46 of the terminal device, which comprises a display unit and a keyboard unit. The control unit also controls the memory 45 belonging to the terminal device, into which memory the software application that implements the method according to the invention has advantageously been saved.

The control unit 44 controls the media record editing and presentation according to the invention. In this control operation it utilizes the software application according to the invention saved in the memory 45. Said software application has been arranged to control the presentation and editing of the media clip, utilizing the presentation and editing modes shown in connection with FIG. 3.

Some advantageous embodiments of the method and terminal device according to the invention have been described above. The invention is not limited to the above described solutions only, but the inventive idea can be applied in many ways within the scope defined by the claims.

The invention claimed is:

1. A method for editing a media record of a terminal device comprising:
   playing the media record on a display of the terminal device in a first, a second, and a third presentation mode;
   displaying a pointer line associated with the media record on the display;
   operating in the first presentation mode to allow for setting of a start mark in the media record by a first key of the terminal device and not allowing the setting of a stop mark by a second key of the terminal device;
   in response to the setting of the start mark, displaying the start mark on the pointer line and operating in the second presentation mode to allow for resetting of the start mark in the media record by the first key of the terminal device and to allow for setting of the stop mark by the second key of the terminal device;
   in response to the setting of the stop mark, displaying the stop mark on the pointer line and operating in the third presentation mode to allow for resetting of the stop mark in the media record by the second key of the terminal device and not allowing for the resetting of the start mark by the first key of the terminal device; and
   saving the portion of the media record between the start and stop marks.

2. The method according to claim 1, wherein the first and second keys are separate physical keys located below the display.

3. The method according to claim 1, further comprising playing a first acoustic signal in response to the setting of the start mark and playing a second acoustic signal in response to the setting of the stop mark.

4. The method according to claim 1, wherein the media record is either an audio record, a video record or an animation record.

5. The method according claim 1, further comprising saving the portions of the media record outside the start and stop marks.

6. The method according to claim 1, further comprising displaying a location pointer on the pointer line, wherein the location pointer moves along the pointer line indicating the current position of media record during playing of the media record.

7. The method according to claim 1, further comprising pausing the playing of the media record in response to actuation of a third key of the terminal device.

8. The method according to claim 7, wherein playing of the media record is continued in response to actuation of the first key of the terminal device.

9. An apparatus for editing a media record comprising:
a display configured to play the media record in a first, a second, and a third presentation mode and to display displaying a pointer line associated with the media record;
a controller configured to operate the apparatus in the first presentation mode to allow for setting of a start mark in the media record by a first key of the apparatus and not allowing the setting of a stop mark by a second key of the apparatus; in response to the setting of the start mark, to display the start mark on the pointer line and to operate in the second presentation mode to allow for resetting of the start mark in the media record by the first key of the apparatus and to allow for setting of the stop mark by the second key of the apparatus; and in response to the setting of the stop mark, configured to display the stop mark on the pointer line and to operate in the third presentation mode to allow for resetting of the stop mark in the media record by the second key of the apparatus and not allowing for the resetting of the start mark by the first key of the apparatus; and
a memory configured to save the portion of the media record between the start and stop marks.

10. The apparatus according to claim 9, wherein the first and second keys are separate physical keys located below the display.

11. The apparatus according to claim 9, wherein said control unit is further configured to play a first acoustic signal in response to the setting of the start mark and to play a second acoustic signal in response to the setting of the stop mark.

12. The apparatus according to claim 9, wherein the media record is either an audio record, a video record or an animation record.

13. The apparatus according to claim 9, wherein said memory is further configured to save the portions of the media record outside the start and stop marks.

14. The apparatus according to claim 9, wherein said display is further configured to display a location pointer on the pointer line, wherein the location pointer moves along the pointer line indicating the current position of media record during playing of the media record.

15. The apparatus according to claim 9, wherein said control unit is further configured to pause the playing of the media record in response to actuation of a third key of the terminal device.

16. The apparatus according to claim 15, wherein playing of the media record is continued in response to actuation of the first key of the terminal device.

17. A non-transitory computer readable medium stored with instructions, which when executed by a processor, cause a terminal device to perform:
playing a media record on a display of the terminal device in a first, a second, and a third presentation mode;
displaying a pointer line associated with the media record on the display;
operating in the first presentation mode to allow for setting of a start mark in the media record by a first key of the terminal device and not allowing the setting of a stop mark by a second key of the terminal device;
in response to the setting of the start mark, displaying the start mark on the pointer line and operating in the second presentation mode to allow for resetting of the start mark in the media record by the first key of the terminal device and to allow for setting of the stop mark by the second key of the terminal device;
in response to the setting of the stop mark, displaying the stop mark on the pointer line and operating in the third presentation mode to allow for resetting of the stop mark in the media record by the second key of the terminal device and not allowing for the resetting of the start mark by the first key of the terminal device; and
saving the portion of the media record between the start and stop marks.

18. The non-transitory computer readable medium of claim 17, wherein the first and second keys are separate physical keys located below the display.

19. The non-transitory computer readable medium of claim 17, further stored with instructions, which when executed by the processor, cause the terminal device to perform playing a first acoustic signal in response to the setting of the start mark and playing a second acoustic signal in response to the setting of the stop mark.

20. The non-transitory computer readable medium of claim 17, wherein the media record is either an audio record, a video record or an animation record.

21. The non-transitory computer readable medium of claim 17, further stored with instructions, which when executed by the processor, cause the terminal device to perform saving the portions of the media record outside the start and stop marks.

22. The non-transitory computer readable medium of claim 17, further stored with instructions, which when executed by the processor, cause the terminal device to perform displaying a location pointer on the pointer line, wherein the location pointer moves along the pointer line indicating the current position of media record during playing of the media record.

23. The non-transitory computer readable medium of claim 17 further stored with instructions, which when executed by the processor, cause the terminal device to perform pausing the playing of the media record in response to actuation of a third key of the terminal device.

24. The non-transitory computer readable medium of claim 23, wherein playing of the media record is continued in response to actuation of the first key of the terminal device.

* * * * *